United States Patent

Smith et al.

[11] 3,905,922
[45] Sept. 16, 1975

[54] FLAME RETARDANT URETHANE FORMS CONTAINING ALKANOL AMINO PHOSPHONATES

[75] Inventors: Curtis P. Smith, Cheshire; Henri Ulrich, Northford, both of Conn.

[73] Assignee: The Upjohn Company, Kalamazoo, Mich.

[22] Filed: Oct. 7, 1974

[21] Appl. No.: 512,438

Related U.S. Application Data

[62] Division of Ser. No. 386,520, Aug. 8, 1973, Pat. No. 3,855,363.

[52] U.S. Cl................... 260/2.5 AJ; 260/2.5 AM; 260/77.5 AQ; 260/77.5 AR; 260/77.5 SS
[51] Int. Cl.² ................. C08G 18/32; C08G 18/14
[58] Field of Search .. 260/2.5 AJ, 2.5 AM, 77.5 SS, 260/77.5 AR, 77.5 AQ, 944

[56] References Cited
UNITED STATES PATENTS

| | | | |
|---|---|---|---|
| 3,385,914 | 5/1968 | Hindersinn | 260/944 |
| 3,480,594 | 11/1969 | Price | 260/2.5 AJ |
| 3,501,421 | 3/1970 | Hindersinn | 260/77.5 AR |
| 3,674,748 | 7/1972 | Iliopulos | 260/2.5 AJ |
| 3,855,363 | 12/1974 | Smith | 260/77.5 AQ |

Primary Examiner—M. J. Welsh
Assistant Examiner—C. Warren Ivy
Attorney, Agent, or Firm—Denis A. Firth; John Kekich

[57] ABSTRACT

Compounds are described which are useful as flame retardants for chemical incorporation into polyurethane and like polymer foams and which have the formula:

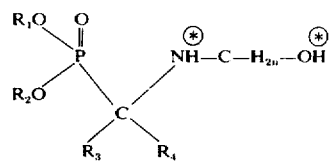

wherein $R_1$ and $R_2$ are each hydrocarbyl or halohydrocarbyl, $C_nH_{2n}$ is alkylene $(C_{a-b})$ and $R_3$ and $R_4$ taken together with the attached C atom are the residue of a cycloalkane, cycloalkene or cycloalkanone. The compounds have two active hydrogen atoms (marked with an asterisk) which show substantially equal reactivity towards isocyanato groups in sharp contrast to closely related compounds hitherto known.

1 Claim, No Drawings

FLAME RETARDANT URETHANE FORMS CONTAINING ALKANOL AMINO PHOSPHONATES

This is a division of application Ser. No. 386,520 filed Aug. 8, 1973, now U.S. Pat. No. 3,855,363.

BACKGROUND OF THE INVENTION

1. Field of the Invention

This invention relates to novel phosphonates and is more particularly concerned with novel aminoalkanephosphonates and with polymer foams having said components incorporated therein.

2. Description of the Prior Art

A variety of phosphorus-containing polyols has been described for use, in particular, in imparting flame retardancy to polyurethane foams by including the phosphorus-containing polyol as part of the polyol component which is to be reacted with polyisocyanate in the preparation of said foam. Such phosphorus-containing polyols become chemically incorporated into the polymer backbone. They are therefore preferred over other phosphorus and/or halogen containing fire retardant additives which contain no active hydrogen atom and which, because of this, cannot become chemically incorporated into the polymer and tend to leach out of the resulting foams over a period of time.

One of the most commonly employed class of phosphorus containing polyols is the class of dialkyl di(hydroxyalkyl)aminomethane phosphonates disclosed in U.S. Pat. No. 3,076,010. These materials are recognized in the art to impart highly significant flame retardant properties to polyurethane foams in which they are incorporated. However, they suffer the disadvantage of exhibiting a tendency to impart hydrolytic instability to the polyurethane and also of being relatively unstable when stored in combination with other polyols employed in the preparation of polyurethane foams. It is common practice to supply two component systems for the manufacture of polyurethanes, one component being a polyisocyanate or an isocyanate-terminated prepolymer, and the second component being a mixture of the polyols, surfactants, catalysts and like additives. The two components are stored separately until they are mixed to produce the desired polyurethane. Accordingly, it is highly desirable that any phosphorus-containing polyol employed in such systems be stable on storage in combination with the other polyol components.

U.S. Pat. No. 3,385,914 describes closely related aminomethane-phosphonates which contain at least two active hydrogen atoms, rendering them capable of chemical incorporation into the polyurethane, and which are possessed of improved hydrolytic stability and storage stability in combination with other polyols. Typical of these compounds is dimethyl N-(2-hydroxyethyl)-2-aminopropyl-2-phosphonate which has the following formula:

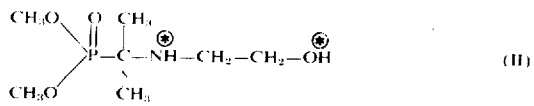

The two active hydrogen atoms are indicated by asterisks. Unfortunately, it is found that the active hydrogen atom attached to the nitrogen atom in the above molecule has a much greater activity, in reaction with isocyanate groups, than does the active hydrogen atom of the hydroxyl group. So much so that reaction between the above compound and isocyanate takes place almost exclusively via the active hydrogen atom attached to nitrogen and little or no reaction occurs at the hydroxyl group. Hence, the phosphorus containing compound of the above formula tends to act as a chain stopper when employed in the preparation of polyurethane foams.

We have now found a related series of compounds which are free from the above problem but which do possess good hydrolytic stability when incorporated in polyurethane foam, and storage stability when stored in combination with other conventional polyols.

DETAILED DESCRIPTION OF THE INVENTION

The invention comprises a compound having the formula:

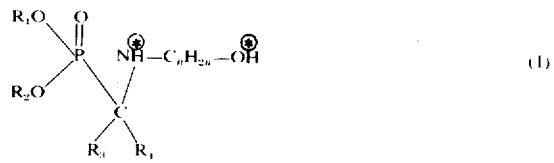

wherein $R_1$ and $R_2$ are each selected from the class consisting of hydrocarbyl from 1 to 12 carbon atoms, inclusive, and halo-substituted hydrocarbyl from 1 to 12 carbon atoms, inclusive;

$C_nH_{2n}$ represents alkylene from 2 to 8 carbon atoms, inclusive, having at least two carbon atoms separating the valencies; and $R_3$ and $R_4$, taken together with the carbon atom to which they are attached, represent the residue of a cyclic member selected from the class consisting of cycloalkane, a cycloalkene, and a cycloalkanone, each of said cycloalkane, cycloalkene and cycloalkanone having from 4 to 8 ring carbon atoms, inclusive, and having from 0 to 4 lower-alkyl substituents.

The invention also comprises polyurethane foams having incorporated therein, as part or the whole of the polyol component used in their preparation, a phosphorus-containing compound of the formula (I).

The term "hydrocarbyl from 1 to 12 carbon atoms, inclusive", means the moiety obtained by removing one hydrogen atom from a hydrocarbon having the stated carbon atom content. Illustrative of hydrocarbyl are alkyl, such as methyl, ethyl, propyl, hexyl, octyl, decyl, dodecyl and the like; alkenyl such as allyl, methallyl, hexenyl, nonenyl, undecenyl, dodecenyl, and the like; cycloalkyl, such as cyclobutyl, cyclohexyl, cyclooctyl, methylcyclohexyl, dimethylcyclohexyl, and the like; cycloalkenyl such as cyclopentenyl, cyclohexenyl, cycloheptenyl, cyclooctenyl, methylcycloheptenyl, and the like; aralkyl such as benzyl, phenethyl, phenylpropyl, phenylhexyl, naphthylmethyl, and the like; and aryl such as phenyl, tolyl, xylyl, naphthyl, biphenylyl, and the like.

The term "halo-substituted hydrocarbyl from 1 to 12 carbon atoms, inclusive" means hydrocarbyl, as above defined, in which at least one hydrogen atom has been replaced by halo i.e. fluoro, chloro, bromo or iodo. Said halo-substituted hydrocarbyl moieties can contain up to 6 halo atoms, if desired.

The term "alkylene from 2 to 8 carbon atoms, inclusive, having at least two carbon atoms separating the valencies" is inclusive of ethylene, 1,2-propylene, 1,3-propylene, 1,2-butylene, 1,4-butylene, 2,3-hexylene, 1,2-octylene, 3-methyl-1,4-pentylene, 2-methyl-1,3-butylene, 1,6-hexylene and the like.

Illustrative of cycloalkane having from 0 to 4 lower-alkyl substituents are cyclobutane, methylcyclobutane, cyclopentane, methylcyclopentane, ethylcyclopentane, dimethylcyclopentane, cyclohexane, isopropylcyclohexane, cycloheptane, methylcycloheptane, trimethylcycloheptane, ethyltrimethylcyclohexane, cyclooctane and the like. Illustrative of cycloalkene having from 0 to 4 lower-alkyl substituents are cyclobutene, cyclopentene, cyclohexene, cycloheptene, cyclooctene, methylcyclopentene, trimethylcyclopentene, isopropylcyclohexene, methylethylbutylcyclohexene, tetramethylcyclopentene, and the like. Illustrative of cycloalkanone having from 0 to 4 lower-alkyl substituents are cyclobutanone, cyclopentanone, cyclohexanone, cycloheptanone, cyclooctanone, methylcyclopentanone, trimethylcyclohexanone, methylisobutylcycloheptanone, tetramethylcyclooctanone, and the like.

The term "lower-alkyl" means alkyl from 1 to 6 carbon atoms, inclusive, such as methyl, ethyl, propyl, butyl, pentyl, and hexyl including isomeric forms thereof.

DETAILED DESCRIPTION OF THE INVENTION

The compounds of the formula (I) can be prepared using procedures well-recognized in the art. Illustratively, the compounds of the formula (I) can be prepared by the process shown schematically as follows:

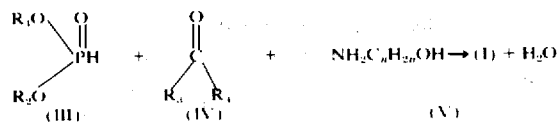

wherein $R_1$, $R_2$, $R_3$, $R_4$ and $C_nH_{2n}$ are as hereinbefore defined. The reaction can be carried out under conditions generally employed in the art as illustrated, for example, by the reaction conditions described in the aforesaid U.S. Pat. Nos. 3,076,010 and 3,385,914.

Briefly, the reactants are brought together in substantially stoichiometric proportions in the presence of an inert organic solvent i.e. a solvent which does not enter into, or in any way interfere with, the desired course of the reaction. Illustrative of such solvents are alkanols such as methanol, ethanol, isopropanol, and the like, ethers such as diethyl ether, dioxane, tetrahydrofurane, and the like, and hydrocarbons such as hexane, heptane, octane, benzene, toluene, cyclohexane and the like. Advantageously, the dihydrocarbylphosphate (III) and the alkanolamine (V) are brought together in the inert organic solvent and the ketone (IV) is added to the mixture usually in increments to control the exothermic reaction which takes place. The reaction temperature is advantageously maintained in the range of about 40°C to about 60°C by cooling if necessary and-/or by controlling the rate of addition of the ketone (IV). The resulting product (I) is isolated from the reaction mixture by conventional procedures e.g. by evaporation of the solvent and purification of the residue if desired, by distillation under reduced pressure (in the case where the product is a liquid), recrystallization (in the case where the product is a solid) or by other conventional techniques.

Those compounds of the formula (I) wherein the group $C_nH_{2n}$ has only two carbon atoms between the valencies i.e. wherein $C_nH_{2n}$ is ethylene or a lower-alkyl-substituted ethylene, can be prepared by an alternative method which is illustrated by the following scheme:

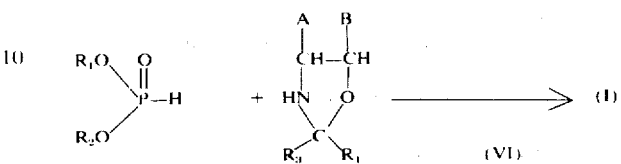

wherein $R_1$, $R_2$, $R_3$ and $R_4$ are as hereinbefore defined and A and B represent hydrogen or lower-alkyl. The compound (VI) is the product obtained by condensing the alkanolamine

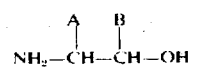

and the ketone (IV) in the presence of an inert solvent under the temperature conditions discussed. While we believe that the product so obtained is in the form of an oxazolidine represented by the formula (VI) above there is some dispute in the literature as to the nature of such products. It has been suggested (Bergmann et al. J. A. C. S. 75,358,1953) that the product is actually an equilibrium mixture of the oxazolidine (VI) and the corresponding imine or Schiff's base represented by the formula

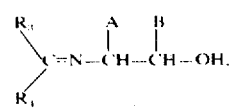

the proportion of the two components being determined by the nature of the ketone. It is unnecessary to discuss this question in detail here but we wish to make it clear that, whatever the actual fine details of the structure, the compound (VI) is intended to represent the product of condensation of the ketone (IV) and the alkanolamine

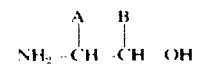

since it is this condensation product, whatever its structure, which is employed in the reaction with the dihydrocarbylphosphite (III) in the alternative synthesis of the compounds (I) of the invention.

The dihydrocarbyl phosphite (III), the ketones (IV) and the alkanolamines (V) are so well-known in the art, as are methods for their preparation, that it is unnecessary to catalogue such details here.

The novel compounds (I) of the invention are useful in that, when incorporated into polyurethane foams by methods to be described hereinafter, they impart flame retardance thereto. They have the advantage that they can be stored for prolonged periods in combination with other polyol components without causing deleterious effects, they do not reduce the hydrolytic stability of polyurethane foams into which they are incorporated and they possess two active hydrogen atoms of approximately equal activity towards isocyanate groups thus ensuring that they become chemically incorporated without difficulty into the polyurethane polymer chain. They do not act as chain stoppers when so used.

The novel compounds (I) of the invention can be incorporated into polyurethane foams simply by replacing at least a part of the polyol employed in the condensation with polyisocyanate in the preparation of said foam, with compound (I). In order to produce significant flame retardancy, the amount of compound (I) incorporated in the foam is generally such that the resultant foam contains at least 1.0 percent by weight of phosphorus. The methods employed in the art to prepare polyurethane foams are so well-known as to need no detailed description here: see, for example, Saunders et al., Polyurethanes, Chemistry and Technology Part II, pp. 1 – 298, 1964, Interscience, New York.

The following examples describe the manner and process of making and using the invention, and set forth the best mode contemplated by the inventors of carrying out the invention, but are not to be construed as limiting.

EXAMPLE 1

Di(2-chloropropyl) 1-(2-hydroxyethyl)aminocyclohexylphosphonate

A total of 170.3 g. (1.74 mole) of cyclohexanone was added with stirring to a solution of 109.8 g. (1.80 mole) of monoethanolamine in 300 ml. of benzene. The resulting mixture was heated under reflux and the water of condensation which was eliminated was removed continuously by azeotropic distillation using a Dean-Stark trap. The theoretical amount of water (31.3 ml.) was removed in 2 hr. At the end of this period the benzene was removed by distillation under reduced pressure. The residue (244 g.) was a golden colored liquid which can be represented by one of the formulae:

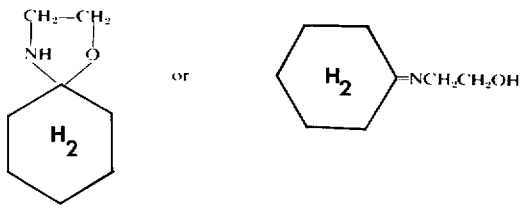

or possibly an equilibrium mixture of the two.

A portion (177.7 g.:1.26 mole) of the above liquid was treated slowly with stirring with a total of 290.6 g. (1.238 mole) of bis(2-chloropropyl)phosphite (Walsh, JACS, 81, 3023, 1959) over a period of 20 minutes. The temperature was kept below 60°C by cooling during the addition. After the addition was complete the resulting mixture was stirred and allowed to cool to room temperature (circa 20°C). There was thus obtained 461.9 g. of di(2-chloropropyl) 1-(2-hydroxyethyl)aminocyclohexylphosphonate having the formula:

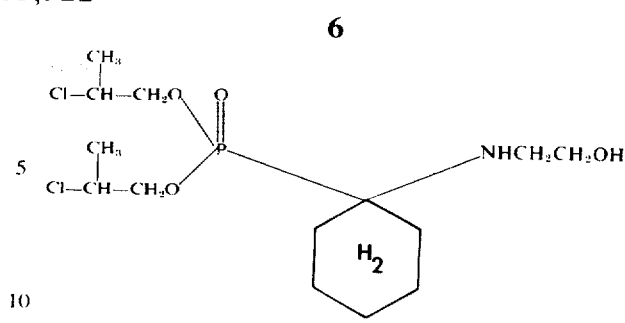

in the form of a clear yellow oil. *Analysis:* Calcd. for $C_{14}H_{28}NO_4PCl_2$: C, 44.7; H, 7.4; N, 3.7; P, 8.2; Cl, 18.8. Found: C, 44.2; H, 7.5; N, 3.6; P, 7.5; Cl, 18.4.

EXAMPLE 2

Diethyl 1-(2-hydroxyethyl)aminocyclohexylphosphonate

Using the procedure described in Example 1, but replacing the di(2-chloropropyl)phosphite by an equivalent amount of diethyl phosphite, there was obtained diethyl 1-(2-hydroxyethyl)aminocyclohexylphosphonate having the formula:

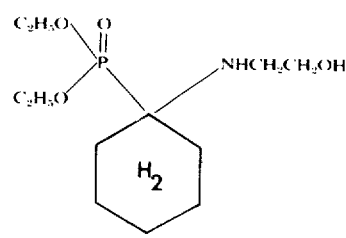

in the form of a clear yellow liquid. *Analysis:* Calcd. for $C_{12}H_{26}NO_4P$: C, 51.61; H, 9.32; N, 5.02; P, 11.11. Found: C, 51.39; H, 9.64; N, 4.95; P, 10.66.

EXAMPLE 3

Using the procedure described in Example 1, but replacing the cyclohexanone there used by an equivalent amount of isophorone (3,5,5-trimethyl-2-cyclohexenone), there was obtained di(2-chloropropyl) 1(2-hydroxyethyl)-amino-3,5,5-trimethyl-2-cyclohexenyl-phosphonate having the formula:

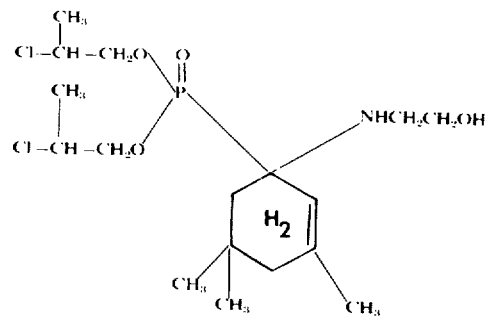

Similarly, using the procedure described in Example 1, but replacing cyclohexanone by an equivalent amount of cyclopentanone, 2,2,4,4-tetramethylbutanedione-1,3, 2-cycloheptenone, or cyclooctanone, there was obtained:

di(2-chloropropyl) 1-(2-hydroxyethyl)aminocyclopentylphosphonate, di(2-chloropropyl) 1-(2-hydroxyethyl)amino-2,2,4,4-tetramethylcyclobutan-3-onylphosphonate di(2-chloropropyl) 1-(2-hydroxyethyl)amino-2-cycloheptenylphosphonate; and di(2-chloropropyl) 1-(2-hydroxyethyl)aminocyclooctylphosphonate, respectively.

EXAMPLE 4

Using the procedure described in Example 1, but replacing the di(2-chloropropyl)phosphite there employed by an equivalent amount of diphenyl phosphite, there was obtained diphenyl 1-(2-hydroxyethyl)aminocyclohexylphosphonate.

Similarly, using the procedure described in Example 1, but replacing the di(2-chloropropyl)phosphite there employed by an equivalent amount of di(trichloromethyl) phosphite, di n-hexyl phosphite, diallyl phosphite, di(p-chlorophenyl) phosphite, dibenzyl phosphite or dichlorohexyl phosphite, there were obtained:

di(trichloromethyl),
di-n-hexyl,
di-allyl,
di-(p-chlorophenyl),
di-benzyl, and
dicyclohexyl 1-(2-hydroxyethyl)aminocyclohexylphosphonate.

EXAMPLE 5

A mixture of 74 g. (1 mole) of isopropanolamine, 138 g. (1 mole) of diethyl phosphite and 200 g. (1.4 mole) of anhydrous sodium sulfate in 200 ml. of benzene was stirred while a total of 98 g. (1 mole) of cyclohexanone was added. The mixture was cooled when necessary to maintain the reaction temperature below about 50°C. After the temperature subsided the mixture was stirred for a further 2 hours and then filtered. The filtrate was evaporated to dryness. There was thus obtained diethyl 1-(2-hdyroxypropyl)aminocyclohexylphosphonate.

Similarly, using the above procedure, but replacing the isopropanolamine by propanolamine, hexanolamine, octanolamine, 2-hydroxyhexylamine and 4-hydroxy-2-octylamine, there was obtained:

diethyl 1-(3-hydroxypropyl)aminocyclohexylphosphonate
diethyl 1-(6-hydroxyhexyl)aminocyclohexylphosphonate
diethyl 1-(2-hydroxyhexyl)aminocyclohexylphosphonate, and diethyl 1-(4-hydroxy-2-octyl)aminocyclohexylphosphonate, respectively.

EXAMPLE 6

The following experiment was carried out to compare the relative rates of reactivity of the two active hydrogen atoms in di(2-chloropropyl) 1-(2-hydroxyethyl)aminocyclohexyl phosphonate (prepared as described in Example 1) and the previously known di(2-chloropropyl) 2-(2-hydroxyethyl)-amino-2-propylphosphonate [prepared from di(2-chloropropyl)-phosphite, acetone and ethanolamine using the procedure described in Example 1].

A solution of 3.5 g. (0.0093 mole) of di(2-chloropropyl) 1-(2-hydroxyethyl)aminocyclohexylphosphonate in 50 ml. of anhydrous benzene was admixed, with stirring, with 1.12 ml. (0.0093 mole) of phenyl isocyanate. The progress of reaction was followed by infrared spectral analysis of aliquots. It was found that, over a period of 5 hours, the absorption band corresponding to isocyanate gradually disappeared while absorption bands corresponding to formation of urethane (5.80 $\mu$) and urea (5.96 $\mu$) were formed at substantially equal rates.

In contrast, when the above procedure was repeated using a solution of 3 g. (0.0089 mole) of di(2-chloropropyl) 2-(2-hydroxyethyl)amino-2-propylphosphonate in 50 ml. of anhydrous benzene, to which was added 1 ml. of phenyl isocyanate, it was found that the absorption band corresponding to isocyanato disappeared within a very short period (30 minutes) and a very strong band at 6.0 $\mu$ (urea) appeared within the same time period. Even after 6 hours of reaction there was no detectable band at 5.8$\mu$ (urethane). However, when a second 1 ml. portion of phenylisocyanate was added the absorption band at 5.8$\mu$ slowly appeared.

The above experiments indicate that, in the case of di(2-chloropropyl) 1-(2-hydroxyethyl)aminocyclohexylphosphonate the active hydrogen atoms attached to nitrogen and to oxygen reacted with isocyanate at substantially the same rate. In the case of di(2-chloropropyl) 2-(2-hydroxyethyl)amino-2-propylphosphonate the active hydrogen atom attached to nitrogen reacted with isocyanate to the complete exclusion of reaction with the active hydrogen atom attached to oxygen. Only when all the active hydrogen attached to nitrogen had reacted i.e. after 1 molar proportion of isocyanate had been used and a second such portion added, did any reaction occur at the active hydrogen atom attached to oxygen.

EXAMPLE 7

Rigid polyurethane foams were prepared using a standard formulation in which 25% by weight of the polyol component was replaced by the compound of Example 1, and, for comparison purposes, by the compound diethyl di(2-hydroxyethyl)aminomethanephosphonate [Fyrol 6]. The formulations (all parts by weight) and physical properties of the two foams are recorded in Table 1. In both cases the polyols, surfactant, catalyst and water were blended, the freon was added, and finally the polyisocyanate was admixed with high speed stirring for 15 seconds. The resulting mixture was allowed to foam freely in a paper cup and the foam so obtained was cured in air at room temperature (circa 20°C) for 3 days.

It will be seen that the foam (Foam A) prepared using the phosphorus containing diol of Example 1 had superior physical strength properties and markedly less shrinkage on humid aging than did the foam (Foam B) prepared from the known phosphorus compound.

Table 1

|  | Foam A | Foam B |
|---|---|---|
| Polymethylene polyphenyl polyisocyanate (Equiv. wt = 133) | 154.93 | 154.93 |
| Polyol blend' (eq. wt = 151) | 75 | 75 |
| Phosphorus containing polyol (Example 1) | 25 | |
| Fyrol 6 | | 25 |
| Water | 0.45 | 0.45 |
| Surfactant | 2.0 | 2.0 |
| Triethylamine | 1.3 | 1.3 |
| Freon (11B) | 40.2 | 40.2 |

Table 1-Continued

|  | Foam A | Foam B |
|---|---|---|
| PROPERTIES | | |
| Density, pcf. | 2.55 | 2.92 |
| Compressive strength psi | | |
| to rise | 58.8 | 27.0 |
| perpendicular to rise | 27.8 | 17.8 |
| % volume change on humid age at 158°F and 100% humidity | | |
| 1 day | 2.6 | 9 |
| 3 days | 4.6 | 14.2 |
| 7 days | 6.4 | 11.0 |
| 14 days | 9.3 | 11.1 |
| % volume change on dry aging at 200°F | | |
| 1 day | 0 | 0.6 |
| 7 days | 2.0 | 2.5 |

Footnotes to TABLE 1

[1]Blend of (i) polyol obtained by propoxylating a polymethylene polyphenyl polyamine containing approximately 50% diamine and (ii) the adduct of glycerol and propylene oxide (eq. wt. = 89).
[2]Organosilicone DC-193.

We claim:

1. A fire retardant polyurethane which comprises the product of reaction of a polyol and a polyisocyanate under foam producing conditions characterized in that at least part of said polyol comprises a compound having the formula:

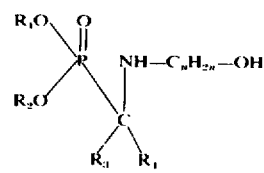

wherein $R_1$ and $R_2$ are each selected from the class consisting of hydrocarbyl from 1 to 12 carbon atoms, inclusive, and halo-substituted hydrocarbyl from 1 to 12 carbon atoms, inclusive;

$C_nH_{2n}$ represents alkylene from 2 to 8 carbon atoms, inclusive, having at least 2 carbon atoms separating the valencies; and $R_3$ and $R_4$, taken together with the carbon atom to which they are attached, represent the residue of a cyclic member selected from the class consisting of cycloalkane, a cycloalkene and a cycloalkanone each of said cycloalkane, cycloalkene and cycloalkanone having from 4 to 8 ring carbon atoms, inclusive, and having from 0 to 4 lower-alkyl substituents.

* * * * *

UNITED STATES PATENT OFFICE
CERTIFICATE OF CORRECTION

Patent No. 3,905,922          Dated September 16, 1975

Inventor(s) Curtis P. Smith and Henri Ulrich

It is certified that error appears in the above-identified patent and that said Letters Patent are hereby corrected as shown below:

[57] Abstract: That portion of the formula shown as

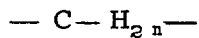          Should read          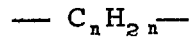

[57] Abstract:                             Should read:

alkylene($C_{a-b}$)                         alkylene($C_{2-8}$)

Column 1, Lines 60 - 65: That portion of the formula shown as

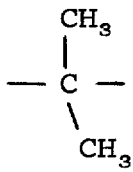          Should read          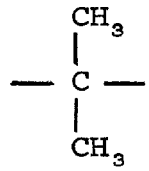

Column 2, Lines 21 - 26: That portion of the formula shown as

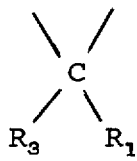          Should read          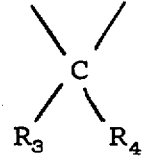

UNITED STATES PATENT OFFICE
CERTIFICATE OF CORRECTION

Patent No. 3,905,922                    Dated September 16, 1975

Inventor(s) Curtis P. Smith and Henri Ulrich

It is certified that error appears in the above-identified patent and that said Letters Patent are hereby corrected as shown below:

Column 3, Lines 33 - 38:

The formula 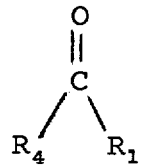    should read    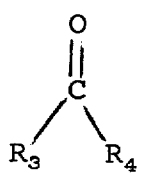

Column 4, Lines 9 - 14:  That portion of the formula shown as

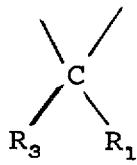    should read    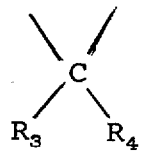

Column 4, Lines 36 - 40:  That portion of the formula shown as

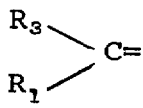    should read    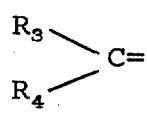

Column 4, Lines 50 - 52:

The formula 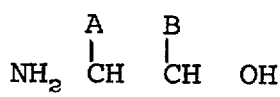    should read    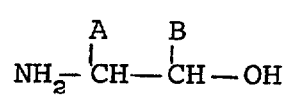

Column 9, Table I, Line 6:            Should read:

to rise                               // to rise

-2- (continued)

UNITED STATES PATENT OFFICE
CERTIFICATE OF CORRECTION

Patent No. 3,905,922                Dated September 16, 1975

Inventor(s)  Curtis P. Smith and Henri Ulrich

It is certified that error appears in the above-identified patent and that said Letters Patent are hereby corrected as shown below:

Column 10, Claim 1, Lines 1 - 6:  That portion of the formula shown as

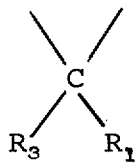           should read           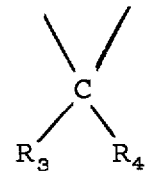

Signed and Sealed this sixth Day of January 1976

[SEAL]

Attest:

RUTH C. MASON  
*Attesting Officer*

C. MARSHALL DANN  
*Commissioner of Patents and Trademarks*